United States Patent
Son et al.

(10) Patent No.: US 9,638,297 B2
(45) Date of Patent: May 2, 2017

(54) RACK BAR SUPPORTING DEVICE FOR STEERING GEAR

(71) Applicant: ERAE AUTOMOTIVE SYSTEMS CO., LTD., Daegu (KR)

(72) Inventors: Chang-Wook Son, Daegu (KR); Seong-Hun Bae, Daegu (KR); Min-Young Choi, Daegu (KR); Jin-Woong Lee, Daegu (KR); Je-Won Kim, Daegu (KR)

(73) Assignee: ERAE AUTOMOTIVE SYSTEMS CO., LTD., Daegu (KR)

( * ) Notice: Subject to any disclaimer, the term of this patent is extended or adjusted under 35 U.S.C. 154(b) by 77 days.

(21) Appl. No.: 14/384,841

(22) PCT Filed: Mar. 4, 2013

(86) PCT No.: PCT/KR2013/001696
§ 371 (c)(1),
(2) Date: Sep. 12, 2014

(87) PCT Pub. No.: WO2013/137576
PCT Pub. Date: Sep. 19, 2013

(65) Prior Publication Data
US 2015/0020619 A1    Jan. 22, 2015

(30) Foreign Application Priority Data
Mar. 14, 2012 (KR) .......................... 10-2012-0025993

(51) Int. Cl.
| | | |
|---|---|---|
| *F16H 19/04* | (2006.01) | |
| *B62D 3/12* | (2006.01) | |
| *F16H 55/28* | (2006.01) | |

(52) U.S. Cl.
CPC ............. *F16H 19/04* (2013.01); *B62D 3/123* (2013.01); *B62D 3/126* (2013.01); *F16H 55/283* (2013.01);
(Continued)

(58) Field of Classification Search
CPC .. F16H 19/04; F16H 2055/281; F16H 55/283; B62D 3/123; B62D 3/126
(Continued)

(56) References Cited

U.S. PATENT DOCUMENTS 4,095,482 A * 6/1978 Kirschner .............. B62D 3/123
74/422
4,788,878 A * 12/1988 Morita ................... B62D 3/123
74/409
(Continued)

FOREIGN PATENT DOCUMENTS

DE       102009028380    *  2/2011    ............. B62D 3/123
DE   WO 2011101196 A1 *  8/2011    ............. B62D 3/123
(Continued)

*Primary Examiner* — William Kelleher
*Assistant Examiner* — Randell J Krug
(74) *Attorney, Agent, or Firm* — Novick, Kim & Lee, PLLC; Jae Youn Kim (57) ABSTRACT

A rack bar supporting device is a device for supporting a rack bar of a steering apparatus of a vehicle toward a pinion shaft and includes a rack bearing and a biasing assembly. The biasing assembly includes an adjustment plug, an adjustment assembly and a support plate assembly. The adjustment assembly includes an adjustment member and a first biasing member. The support plate assembly includes a first support plate, a second support plate, a second biasing member which provides a force for pushing the first support plate along the biasing axis against the second support plate, and a connection structure which connects the first and the
(Continued)

second support plates together so as to restrict movement of the second plate in a direction away from the rack bearing.

19 Claims, 6 Drawing Sheets

(52) U.S. Cl.
 CPC ... *F16H 2055/281* (2013.01); *Y10T 74/18096* (2015.01)

(58) Field of Classification Search
 USPC .............................................. 74/388 PS, 409
 See application file for complete search history.

(56) References Cited

U.S. PATENT DOCUMENTS

| | | | | |
|---|---|---|---|---|
| 6,244,806 | B1* | 6/2001 | Kato | E04B 1/2604 |
| | | | | 411/237 |
| 7,487,984 | B1* | 2/2009 | Lemont, Jr. | B62D 3/123 |
| | | | | 280/93.514 |
| 7,815,204 | B2* | 10/2010 | Kaida | B62D 3/123 |
| | | | | 280/93.514 |
| 7,926,376 | B2* | 4/2011 | Hirose | B62D 3/123 |
| | | | | 384/37 |
| 7,930,951 | B2 | 4/2011 | Eickholt | |
| 8,327,731 | B2* | 12/2012 | Sung | B62D 3/123 |
| | | | | 74/388 PS |
| 8,794,093 | B2* | 8/2014 | Bareis | B62D 3/123 |
| | | | | 74/388 PS |
| 9,003,909 | B2* | 4/2015 | Yang | B62D 3/123 |
| | | | | 280/93.514 |
| 2002/0096005 | A1* | 7/2002 | Oka | B62D 5/0409 |
| | | | | 74/388 PS |
| 2002/0124670 | A1* | 9/2002 | Bugosh | B62D 3/123 |
| | | | | 74/388 PS |
| 2002/0152825 | A1* | 10/2002 | Adams | B62D 3/123 |
| | | | | 74/422 |
| 2003/0136211 | A1* | 7/2003 | Ishii | B62D 5/0409 |
| | | | | 74/388 PS |
| 2004/0221669 | A1* | 11/2004 | Shimizu | B62D 5/0409 |
| | | | | 74/388 PS |
| 2005/0235767 | A1* | 10/2005 | Shimizu | B62D 5/0409 |
| | | | | 74/425 |
| 2007/0209463 | A1* | 9/2007 | Song | B62D 3/123 |
| | | | | 74/388 PS |
| 2008/0190229 | A1* | 8/2008 | Dodak | B62D 3/12 |
| | | | | 74/388 PS |
| 2009/0056479 | A1* | 3/2009 | Nogami | F16K 37/0083 |
| | | | | 73/865.9 |
| 2009/0223314 | A1* | 9/2009 | Eickholt | B62D 3/123 |
| | | | | 74/422 |
| 2010/0122595 | A1* | 5/2010 | Sung | B62D 3/123 |
| | | | | 74/409 |
| 2011/0180213 | A1* | 7/2011 | Hirayama | H01J 37/32192 |
| | | | | 156/345.33 |
| 2011/0303044 | A1* | 12/2011 | Lee | B62D 3/123 |
| | | | | 74/492 |

FOREIGN PATENT DOCUMENTS

| | | | | |
|---|---|---|---|---|
| EP | 1992545 A1 * | 11/2008 | | B62D 3/12 |
| EP | 2098435 A2 | 9/2009 | | |
| FR | 2962508 A1 * | 1/2012 | | B62D 3/123 |
| JP | H10-250611 A | 9/1998 | | |
| KR | 10-2007-0092018 A | 9/2007 | | |
| KR | 100794956 B1 * | 1/2008 | | B62D 3/12 |
| KR | 10-2010-0055724 A | 5/2010 | | |
| KR | 101146936 B1 * | 5/2012 | | B62D 3/123 |

* cited by examiner

RACK BAR SUPPORTING DEVICE FOR STEERING GEAR

TECHNICAL FIELD

The present invention relates to a rack bar supporting device of a steering gear assembly which consists of a steering apparatus for a vehicle.

BACKGROUND ART

A steering apparatus having a steering gear assembly of a rack-pinion type has a structure in which a rack of a rack bar and a pinion gear of a pinion shaft are engaged with one another.

Such a steering gear generally has a rack supporting structure for maintaining a firm engagement of a rack and a pinion to improve a steering performance and a steering feeling.

A rack supporting structure has a rack bearing contacting a rack bar, and has a structure that a coil spring which is supported by an adjustment plug which is installed in a steering gear housing elastically supports a rack bearing.

Such a conventional rack bar supporting device has a problem in that a clearance between a rack bearing and an adjustment plug by abrasion of a rack and a pinion due to long time operation may increase and the increased clearance may cause rattle, vibration, or the like.

DETAILED DESCRIPTION OF THE INVENTION

Technical Problem

The present invention has been made in an effort to provide a rack bar supporting device which can effectively absorb clearance due to abrasion by long time use of a steering gear assembly of a steering apparatus of a vehicle.

Technical Solution

According to an embodiment of the present invention, a rack bar supporting device for supporting a rack bar of a steering apparatus of a vehicle toward a pinion shaft includes: a rack bearing which is disposed at an opposite side of the pinion in a state of contacting the rack bar; and a biasing assembly which provides a force of pushing the rack bearing along a biasing axis toward the rack bar so that the rack bearing pushes the rack bar to be engaged with the pinion shaft. The biasing assembly comprises: an adjustment plug which can be fixed at a plurality of positions along the biasing axis; an adjustment assembly comprising an adjustment member which is formed to be able to move along the biasing axis relatively to the adjustment plug toward the rack bearing and a first biasing member which is connected respectively to the adjustment plug and the adjustment member so as to provide a force of pushing the adjustment member toward the rack bearing with respect to the adjustment plug; and a support plate assembly comprising a first support plate which is supported by the rack bearing, a second support plate which is disposed to face the first support plate in a state of being supported by the adjustment member, a second biasing member which is interposed between the first and the second support plates so as to provide a force of pushing the first support plate along the biasing axis against the second support plate, and a connection structure which connects the first and the second support plates so as to restrict movement of the second support plate in a direction far away from the rack bearing.

The second biasing member may be a disk spring or a coil spring which is interposed between the first and the second support plates in a state of being compressed.

The rack bar supporting device may further include an O-ring which is disposed between the disk spring and the first support plate.

The connection structure may include a bolt and a nut which are engaged with one another, and the first and the second support plates are disposed between a head of the bolt and the nut.

The second support plate may be installed in a state of being supported by the adjustment member to be spaced at an initial installation state from one of the head of the bolt and the nut which restricts movement of the second support plate.

The nut and the first support plate may be integrally formed as one member.

The second support plate may be installed in a state of being supported by the adjustment member to be spaced at an initial installation state from one of the head of the bolt and the nut which restricts movement of the second support plate.

The second support plate may be integrally formed with the bolt head as one member.

The second support plate may be installed in a state of being supported by the adjustment member such that the nut is spaced from the first support plate at an initial installation state.

The first biasing member may be a torsional spring, the adjustment plug may be provided with a first cam structure, and the adjustment member may be provided with a second cam structure which is engaged with the first cam structure so as to move toward the rack bearing along a direction of the biasing axis by a force of the torsional spring.

The second support plate may be installed at an initial installation state in a state of contacting none of the first support plate and the connection structure in the biasing axis, so that gaps exist respectively between the second support plate and the first support plate and between the second support plate and a supporting part of the connection structure.

According to another embodiment of the present invention, a rack bar supporting device for supporting a rack bar of a steering apparatus of a vehicle toward a pinion shaft includes: a rack bearing which is disposed at an opposite side of the pinion in a state of contacting the rack bar; and a biasing assembly which provides a force of pushing the rack bearing along a biasing axis toward the rack bar so that the rack bearing pushes the rack bar to engage with the pinion shaft. The biasing assembly comprises: an adjustment plug which can be fixed at a plurality of positions along the biasing axis; an adjustment assembly comprising an adjustment member which is formed to be able to move along the biasing axis relatively to the adjustment plug toward the rack bearing and a first biasing member which is connected respectively to the adjustment plug and the adjustment member so as to provide a force of pushing the adjustment member toward the rack bearing with respect to the adjustment plug; and a support plate assembly comprising a first support plate which is supported by the rack bearing, a second support plate which is disposed to face the first support plate in a state of being supported by the adjustment member, a second biasing member which is interposed between the first and the second support plates so as to provide a force of pushing the first support plate along the biasing axis with respective to the second support plate, a first support member which supports the first support plate, and a second support member which is connected to the first support member such that the first and the second support plates are disposed therebetween and is formed to restrict movement of the second support plate in a direction away from the rack bearing.

The second biasing member may be a disk spring or a coil spring which is interposed between the first and the second support plates in a state of being compressed.

The rack bar supporting device may further include an O-ring which is disposed between the disk spring and the first support plate.

The second support plate may be disposed at an initial installation state in a state of being supported by the adjustment member to be spaced from the second support member so as not to be supported by the second support member in a direction of the biasing axis.

The first support member and the first support plate may be integrally formed as one member.

The second support plate may be disposed at an initial installation state in a state of being supported by the adjustment member to be spaced from the second support member.

The second support plate may be integrally formed with the second support member as one member.

The second support plate may be disposed at an initial installation state in a state of being supported by the adjustment member such that the first support member is spaced from the first support plate.

The second support plate may be disposed in a state of contacting none of the first support plate and the second support member such that gaps exist in a direction of the biasing axis respectively between the second support plate and the first support plate and between the second support plate and the second support member.

Advantageous Effects

According to the present invention, clearance which may be generated by abrasion by long time use of a steering gear assembly of a steering apparatus of a vehicle cab be effectively compensated.

DETAILED DESCRIPTION OF THE EMBODIMENTS

Devices for supporting a rack bar according to embodiments of the present invention will be described hereinafter with reference to the accompanying drawings.

Figure 1:
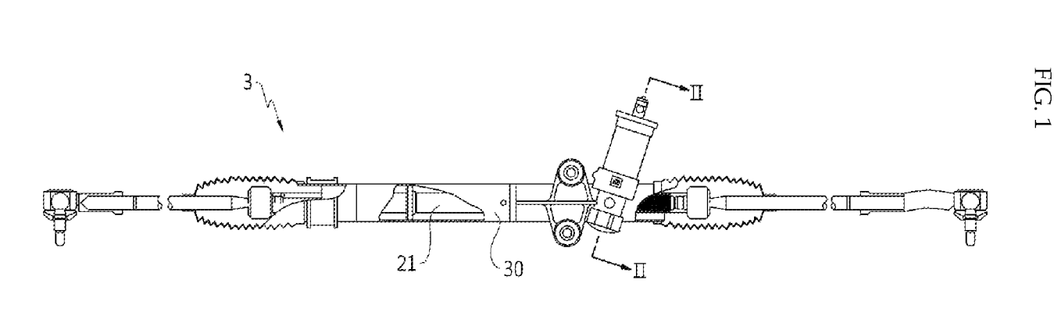
FIG. 1 is a schematic perspective view of a steering gear assembly of a vehicle to which a rack bar supporting device according to an embodiment of the present invention can be applied.
Figure 2:
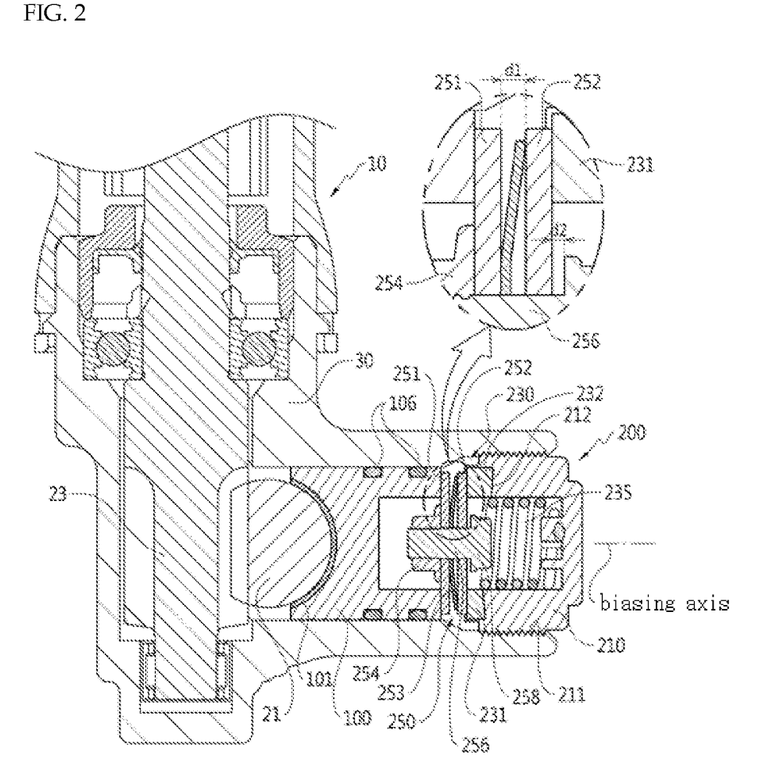
FIG. 2 is a sectional view taken along a line II-II in FIG. 1.
Figure 3:
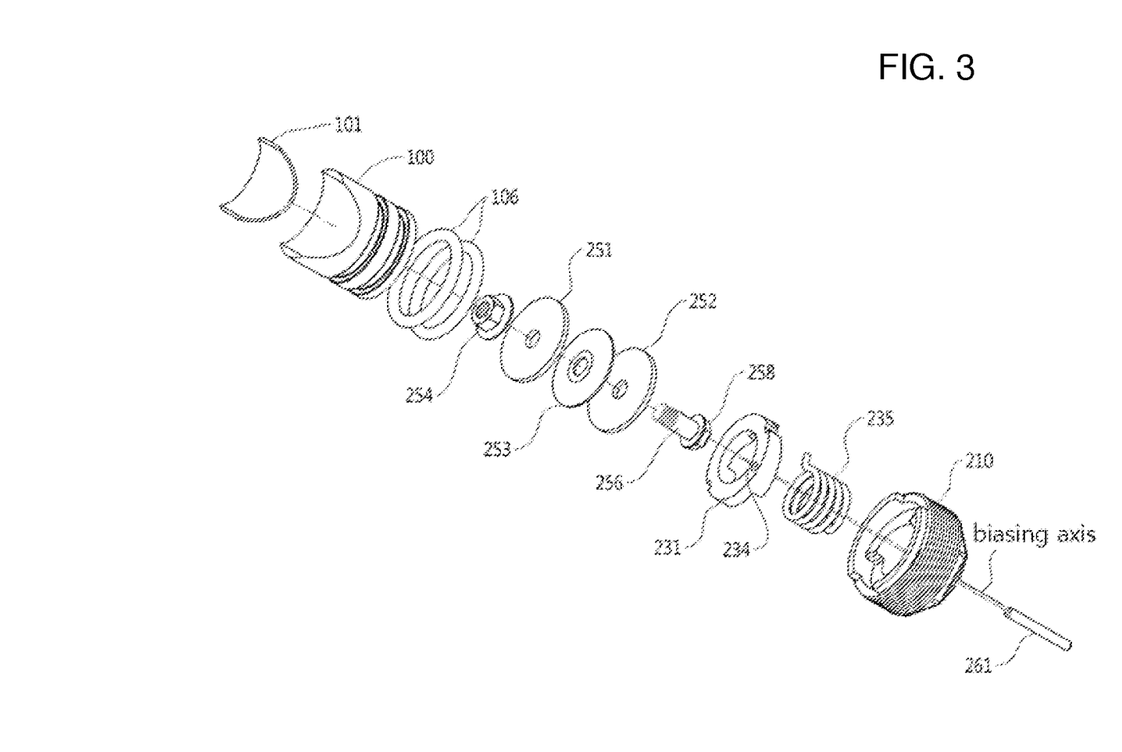
FIG. 3 is an exploded perspective view of a rack bar supporting device according to an embodiment of the present invention.

FIG. 1 is a schematic perspective view of a steering gear assembly of a vehicle to which a rack bar supporting device according to an embodiment of the present invention can be applied, FIG. 1 is a sectional view taken along a line II-II in FIG. 1, and FIG. 3 is an exploded perspective view of a rack bar supporting device according to an embodiment of the present invention.

Referring to FIG. 1 and FIG. 2, a rack bar supporting device according to an embodiment of the present invention supports a rack bar 21 of a steering gear assembly 10 of a steering apparatus of a vehicle toward a pinion shaft 23. Further, a rack bar supporting device according to an embodiment of the present invention has a function of eliminating clearance which may be generated by abrasion of a rack gear and a pinion gear due to long time use of a steering gear assembly.

The pinion shaft 23 is engaged with the rack bar 21, and the pinion shaft 23 and the rack bar 21 are disposed at least partly within a housing 30. The pinion shaft 23 is provided to be rotatable, and the rack bar 21 is provided to be horizontally movable in response to the rotation of the pinion shaft 23.

A rack bearing 100 contacts the rack bar 21 and is disposed at an opposite side of the pinion shaft 23. As exemplarily shown in the drawing, the rack bearing 100 has an indentation at one side thereof so as to at least partly receive the rack bar 21, and the rack bar 21 is inserted into this indentation. Further, a lining 101 may be provided at a portion which the rack bar 21 contacts for smooth movement of the rack bar 21 in a state of contacting the rack bearing 100.

As shown in FIG. 2 and FIG. 3, a groove 104 may be formed on an outer circumference of the rack bearing 100, and an O-ring 106 for damping may be inserted therein.

A biasing assembly 200 provides a force of pushing the rack bearing 100 along a biasing axis toward the rack bar 21 such that the rack bearing 100 pushes the rack bar 21 to be engaged with the pinion shaft 23. That is, the biasing assembly 200 pushes the rack bearing 100, and accordingly the rack bar 21 is pushed by the rack bearing 100, so the rack bar 21 and the pinion shaft 23 are firmly engaged with one another so that clearance therebetween can be absorbed.

Referring to FIG. 2 and FIG. 3, the biasing assembly 200 may include an adjustment plug 210, an adjustment assembly 230 and a support plate assembly 250.

The adjustment plug 210 is formed so as to be stopped at a plurality of positions along the biasing axis. For example, a thread 211 may be formed on an outer circumference of the adjustment plug 210, and the adjustment plug 210 may be threaded to a hole with a thread which is provided to the housing 30. Accordingly, a position of the adjustment plug 210 along the biasing axis may be varied depending the rotation thereof, and the adjustment plug 210 may be stopped at a desired position.

The adjustment assembly 230 may include an adjustment member 231 and a first biasing member 235.

The adjustment member 231 is formed to be movable toward the rack bearing 100 along the biasing axis relative to the adjustment plug 210. For example, as shown in FIG. 2 and FIG. 3, the adjustment member 231 may be formed as a member having a through hole along the biasing axis at a center portion thereof.

The first biasing member 235 are connected respectively to the adjustment plug 210 and the adjustment member 231 to provide a force of pushing the adjustment member 231 toward the rack bearing 100 against the adjustment plug 210.

For example, as shown in FIG. 2 and FIG. 3, the first biasing member 235 may be formed as a torsional spring.

At this time, the adjustment plug 210 may be provided with a space for receiving the torsional spring 235, and one end of the torsional spring 235 is fixed to the adjustment plug 210 and the other end thereof is fixed to the adjustment member 231. Further, the adjustment plug 210 and the adjustment member 231 are respectively provided with cam structures 212 and 232, and the adjustment member 231 rotates by a force of the torsional spring 235 and at this time the adjustment member 231 moves in a direction away from the adjustment plug 210 due to the cam structures 212 and 232.

The support plate assembly 250 may include a first and a second plate 251 and 252, a second biasing member 253 and a connection structure. At this time, the connection structure may include a first and a second support member 254 and 256 which are connected to one another.

As shown in FIG. 2, the first support plate 251 is disposed to be supported against the rack bearing 100, and the second support plate 252 is disposed to face the first support plate 251 in a state of being supported against the adjustment member 231.

At this time, the second support plate 252 is movably disposed between the adjustment member 231 and the first support plate 251 in a state of being supported by the adjustment member 231. That is, in FIG. 2, the second support plate 252 is disposed in a state that the right side thereof is supported by the adjustment member 231.

The second biasing 253 is interposed between the first and the second support plates 251 and 252 to provide a force of pushing the first support plate 251 against the second support plate 252 along the biasing axis. That is, the rack bearing 100 is pushed toward the rack bar 21 by the first support plate 251 which is elastically supported by the second biasing member 253 which is supported against the second support plate 252. For example, as shown in the drawing, the second biasing member 253 may be realized as a disk spring. Meanwhile, in another embodiment of the present invention, the second biasing member may be realized as a coil spring.

At this time, it is configured that there is a gap d1 between the first support plate 251 and the second support plate 252. Accordingly, as long as there is no very big impact from the rack bar 21, the second support plate 252 does not directly collide with the first support plate 251, so noise and impact can be avoided.

Meanwhile, the connection structure interconnects the first support plate 251 and the second support plate 252 together so as to restrict the movement of the second support plate 252 in a direction away from the rack bearing 100. That is, a first and a second support member 254 and 256 which comprises the connection structure interconnects the first and the second support plates 251 and 252 so as to restrict the second support plate 252 from moving away from the rack bearing 100. At this time, the first and the second support members 254 and 256 are connected to one another, and the first and the second support plates 251 and 252 are interposed between the first and the second support members 254 and 256.

At this time, as shown in the drawing, the first support member 254 may be a nut, and the second support member 256 may be a bolt. At this time, as shown in FIG. 2, the bolt 256 may be connected to the nut 254, and the first and the second support plates 251 and 252 may be disposed between the nut 254 and a head 258 of the bolt 256. Referring to the drawing, the nut 254 supports the first supports 251 at a side of rack bearing 100, and the bolt head 256 is located beyond the second support plate 252. In more detail, through holes are respectively formed at center portions of the first and the second support plates 251 and 252, and the bolt 256 is connected to the nut 254 in a state of passing the two through holes. Since a position of the head 258 of the bolt 256 relative the rack bearing 100 and the first support plate 251 is fixed, the second plate 252 is not pushed away by the second biasing member 253 beyond a position of contacting the bolt head 258. Accordingly, the bolt 256 can restrict the movement of the second support plate 252 in a direction away from the rack bearing 100.

According to this structure one side of the second support plate 252 is supported by the adjustment member 231 and the other side thereof is supported by the disk spring 253, and at an initial installation state (i.e., an initial state before abrasion of the rack and pinion) the second support plate 252 may be disposed in an equilibrium state of contacting none of the rack bearing 100 and the second support member (i.e., bolt for performing the function of restricting the movement) 256 (i.e., the support member of the connection structure). That is, as shown in the enlarged circle, it is configured that there is a gap d1 between the second support plate 252 and the first support plate 251 and also there is a gap d2 between the second support plate 252 and the bolt head 258. This arrangement can be set by regulating an elastic force of the disk spring 253, an elastic force of the torsional spring 253, position of the adjustment plug 210 having a cam structure, and so on.

At this time, before the second support plate 252 is installed in a state of being supported by the adjustment member 231, i.e., in case that the support plate assembly 250 is a single part, a gap between the second support plate 252 and the first support plate 251 becomes a value corresponding to the sum of d1 and d2 rather than d1. That is, in this case, the second support plate 252 is in a state of being away farthest from the first support plate 251 by the disk spring 253, i.e., in a state of contacting the bolt head 258.

In other words, the second support plate 252 is spaced from the first support plate 251 by the sum of d1 and d2 before it is installed to be supported by the adjustment member 231, and is being pushed during an installation process by the adjustment member 231 so as to be located at a position away from the first support plate 251 by the gap d1. At this time, the second support plate 252 is spaced from the bolt head 258 by the gap d2.

For example, the adjustment assembly 230 is assembled in a state that the adjustment plug 210 and the adjustment member 231 are twisted by the torsional spring 235, and at this time it may be assembled in a state that the twisted state is maintained by inserting a pin 261 (referring to FIG. 3) into a hole formed in the adjustment plug 210 and a hole formed in the adjustment member 231. That is, the adjustment assembly 230 may become one assembly by being assembled in a state of maintaining a minimum height, and the adjustment assembly 230 is connected to the housing 30 by thread coupling of the adjustment plug 210, and if an assembling is completed such that the adjustment member 231 contacts the support plate assembly 250 so as to form suitable gaps d1 and d2, the pin 261 is removed so that the adjustment member 231 rotates by the torsional spring 235. Accordingly, the rotation by the torsional spring 235 does not occur during the assembling process but occurs after the final assembling.

An operation of the rack bar supporting device having such structures is as follows. Firstly, in case that there is a clearance due to abrasion of the rack and the pinion by long time use of a steering apparatus from the initial installation, the first support plate 251 and the rack bearing 100 moves in a direction of contacting the rack bar 21 by a pushing force of the second biasing member 253 which is supported by the second support plate 252 so as to absorb clearance. At this time, the bolt 256 which is engaged with the nut 254 moves toward the rack bar 21 together with the first support plate 251 along the biasing axis. If the bolt 256 moves by d2 while this process continues for some time, the bolt head 258 contacts the second support plate 252. Subsequently, if clearance is generated in the rack and the pinion by further abrasion, the adjustment member 231 rotates to move along the biasing axis by a force of the torsional spring 235 in a direction of absorbing the generated clearance, and as a result the second support plate 252 moves together, and accordingly the second biasing member 231 pushes the first support plate 251 and the rack bearing 100 so as to absorb clearance. As such, according an embodiment of the present invention, clearance absorbing mechanism of two stages is operated and thereby clearance compensation can be further effectively performed.

Figure 4:
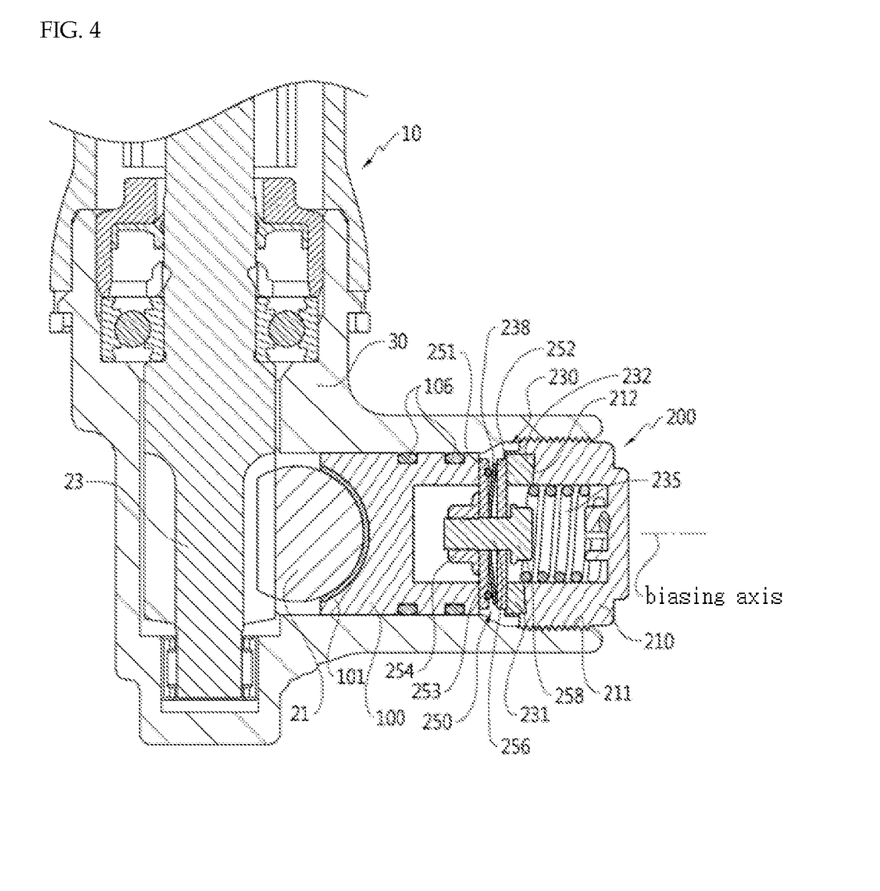
FIG. 4 is a sectional view of a rack bar supporting device according anther embodiment of the present invention.

Meanwhile, referring to FIG. 4, according to another embodiment of the present invention, an O-ring 238 may be disposed between the first support plate 251 and the second biasing member 253. For example, the O-ring 238 may be disposed on one surface of the first support plate 251 facing the second support plate 252. Since the O-ring is provided, the first support plate 251 can be prevented from directly colliding with the disk spring 253 and the second support plate 252 even when a great shock is transmitted. Accordingly, shock and noise can be prevented.

Figure 5:
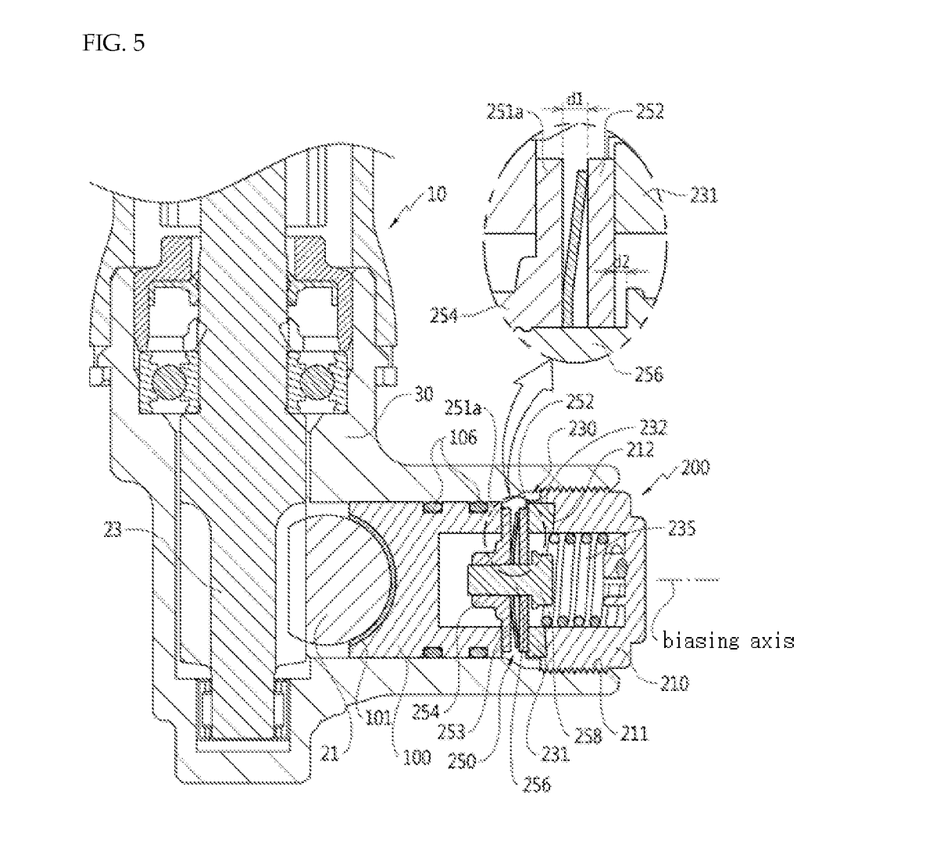
FIG. 5 is a sectional view of a rack bar supporting device according to yet another embodiment of the present invention.
Figure 6:
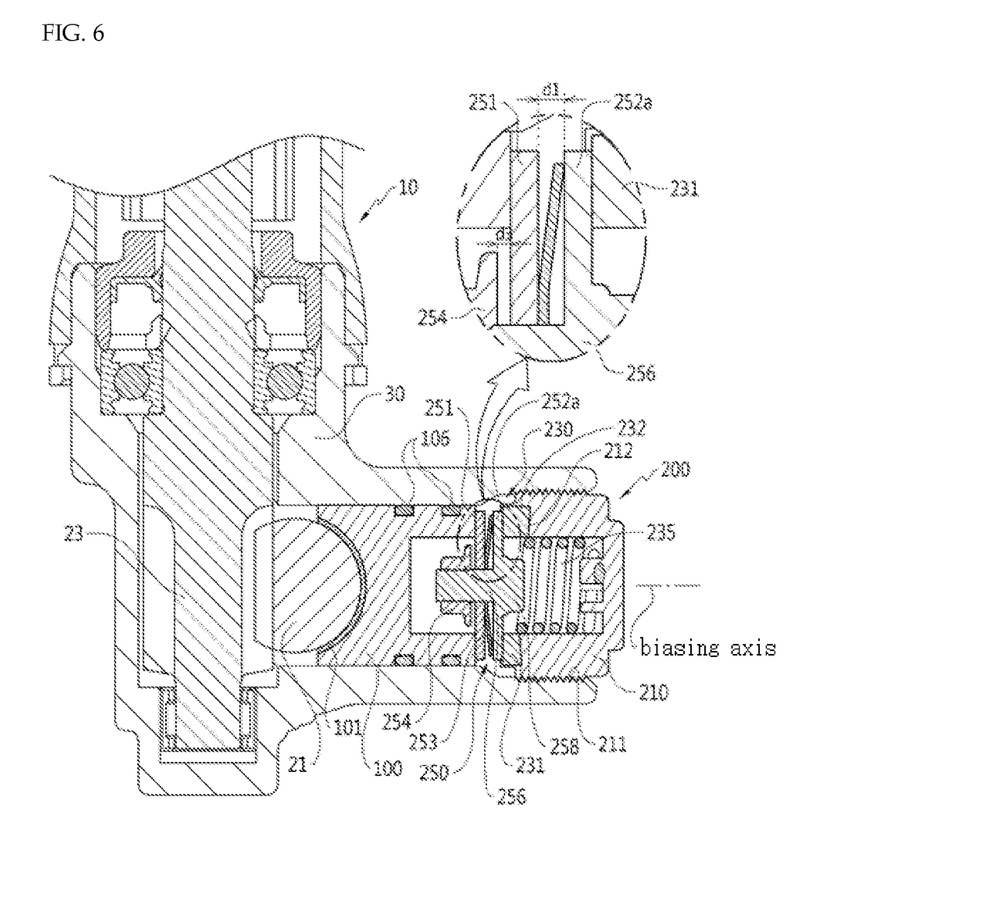
FIG. 6 is a sectional view of a rack bar supporting device according to yet another embodiment of the present invention.

FIG. 5 and FIG. 6 show sectional views of rack bar supporting device according to another embodiments of the present invention.

FIG. 5 is a case in which the first plate and the nut 254 of FIG. 2 are integrally formed as one member. That is, referring to FIG. 5, a first support plate 251a is integrally formed with the nut 254. The first support plate 251a performs the same function with the first support plate 254 which has been described in the above.

Since the nut 254 and the first support plate 251a are integrally formed, the body which is formed by the coupling of the nut 254 and the bolt 256 is prevented from moving relatively to the first support plate 251a, so noise which may be generated by the collision of the nut 254 and the first support plate 251a by vibration is not generated.

Meanwhile, FIG. 6 is a case in which the second support plate and the bolt 256 of FIG. 2 are integrally formed as one member. That is, referring to FIG. 6, the second support plate 252a is integrally formed with the head 258 of the bolt 256. Since the bolt 256 and the second support plate 252a are integrally formed, noise generated by the collision of these two members is not generated. Further, in this case, the gap d2 is not formed, a gap d3 between the nut 254 and the first plate 251 is provided instead of the gap d2 in the initial installation. The gap d3 performs the same function with the gap d2 which is described in the above. That is, the gap d3 which is formed at the initial installation is firstly absorbed while the first support plate 251 moves toward the rack bearing 100 by the second biasing member 253 during the process of abrasion after the initial installation, and clearance due to additional abrasion after the gap d3 was removed is absorbed by the operation of the cam structure.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention relates to a rack bar supporting device for a steering apparatus for a vehicle and can be applied to a steering apparatus of a vehicle, so it has an industrial applicability.

The invention claimed is:

1. A rack bar supporting device for supporting a rack bar of a steering apparatus of a vehicle toward a pinion shaft, comprising;
   a rack bearing which is disposed at an opposite side of the pinion in a state of contacting the rack bar; and
   a biasing assembly which provides a force of pushing the rack bearing along a biasing axis toward the rack bar so that the rack bearing pushes the rack bar to be engaged with the pinion shaft,
   wherein the biasing assembly comprises:
      an adjustment plug which can be fixed at a plurality of positions along the biasing axis;
      an adjustment assembly comprising an adjustment member which is formed to be able to move along the biasing axis relative to the adjustment plug toward the rack bearing and a first biasing member which is connected respectively to the adjustment plug and the adjustment member so as to provide a force of pushing the adjustment member toward the rack bearing with respect to the adjustment plug; and
      a support plate assembly comprising:
         a first support plate which is supported by the rack bearing, a second support plate which is disposed to face the first support plate in a state of being supported by the adjustment member,
         a second biasing member which is interposed between the first and the second support plates so as to provide a force of pushing the first support plate along the biasing axis against the second support plate, and
         a connection structure which connects the first and the second support plates so as to restrict movement of the second support plate in a direction away from the rack bearing, and
      wherein the connection structure comprises a bolt and a nut which are engaged with one another, and the first and the second support plates are disposed between a head of the bolt and the nut.

2. The rack bar supporting device of claim 1, wherein the second support plate is installed in a state of being supported by the adjustment member to be spaced at an initial installation state from one of the head of the bolt and the nut which restricts movement of the second support plate.

3. The rack bar supporting device of claim 1, wherein the first biasing member is a torsional spring, the adjustment plug is provided with a first cam structure, and the adjustment member is provided with a second cam structure which is engaged with the first cam structure so as to move toward the rack bearing along a direction of the biasing axis by a force of the torsional spring.

4. The rack bar supporting device of claim 1, wherein the second biasing member is a disk spring or a coil spring which is interposed between the first and the second support plates in a state of being compressed.

5. The rack bar supporting device of claim 4, further comprising an O-ring which is disposed between the disk spring and the first support plate.

6. The rack bar supporting device of claim 1 wherein the nut and the first support plate are integrally formed as one member.

7. The rack bar supporting device of claim 6, wherein the second support plate is installed in a state of being supported by the adjustment member to be spaced at an initial installation state from one of the head of the bolt and the nut which restricts movement of the second support plate.

8. The rack bar supporting device of claim 1, wherein the second support plate is integrally formed with the bolt head as one member.

9. The rack bar supporting device of claim 8, wherein the second support plate is installed in a state of being supported by the adjustment member such that the nut is spaced from the first support plate at an initial installation state.

10. A rack bar supporting device for supporting a rack bar of a steering apparatus of a vehicle toward a pinion shaft, comprising;
a rack bearing which is disposed at an opposite side of the pinion in a state of contacting the rack bar; and
a biasing assembly which provides a force of pushing the rack bearing along a biasing axis toward the rack bar so that the rack bearing pushes the rack bar to be engaged with the pinion shaft,
wherein the biasing assembly comprises:
an adjustment plug which can be fixed at a plurality of positions along the biasing axis;
an adjustment assembly comprising an adjustment member which is formed to be able to move along the biasing axis relative to the adjustment plug toward the rack bearing and a first biasing member which is connected respectively to the adjustment plug and the adjustment member so as to provide a force of pushing the adjustment member toward the rack bearing with respect to the adjustment plug; and
a support plate assembly comprising:
a first support plate which is supported by the rack bearing,
a second support plate which is disposed to face the first support plate in a state of being supported by the adjustment member, a second biasing member which is interposed between the first and the second support plates so as to provide a force of pushing the first support plate along the biasing axis against the second support plate, and
a connection structure which connects the first and the second support plates so as to restrict movement of the second support plate in a direction away from the rack bearing, and
wherein the second support plate is installed at an initial installation state in a state of contacting none of the first support plate and the connection structure in the biasing axis, so that gaps exist respectively between the second support plate and the first support plate and between the second support plate and a supporting part of the connection structure.

11. The rack bar supporting device of claim 10, wherein the connection structure comprises a first support member which supports the first support plate, and a second support member which is connected to the first support member such that the first and the second support plates are disposed therebetween and is formed to restrict movement of the second support plate in a direction away from the rack bearing.

12. The rack bar supporting device of claim 11, wherein the second biasing member is a disk spring or a coil spring which is interposed between the first and the second support plates in a state of being compressed.

13. The rack bar supporting device of claim 12, further comprising an O-ring which is disposed between the disk spring and the first support plate.

14. The rack bar supporting device of claim 11, wherein the second support plate is integrally formed with the second support member as one member.

15. The rack bar supporting device of claim 14, wherein the second support plate is disposed at an initial installation state in a state of being supported by the adjustment member such that the first support member is spaced from the first support plate.

16. A rack bar supporting device for supporting a rack bar of a steering apparatus of a vehicle toward a pinion shaft, comprising;
a rack bearing which is disposed at an opposite side of the pinion in a state of contacting the rack bar; and
a biasing assembly which provides a force of pushing the rack bearing along a biasing axis toward the rack bar so that the rack bearing pushes the rack bar to be engaged with the pinion shaft,
wherein the biasing assembly comprises:
an adjustment plug which can be fixed at a plurality of positions along the biasing axis;
an adjustment assembly comprising an adjustment member which is formed to be able to move along the biasing axis relative to the adjustment plug toward the rack bearing and a first biasing member which is connected respectively to the adjustment plug and the adjustment member so as to provide a force of pushing the adjustment member toward the rack bearing with respect to the adjustment plug; and
a support plate assembly comprising:
a first support plate which is supported by the rack bearing, a second support plate which is disposed to face the first support plate in a state of being supported by the adjustment member,
a second biasing member which is interposed between the first and the second support plates so as to provide a force of pushing the first support plate along the biasing axis with respect to the second support plate, a first support member which supports the first support plate, and
a second support member which is connected to the first support member such that the first and the second support plates are disposed therebetween and is formed to restrict movement of the second support plate in a direction away from the rack bearing,
wherein the first support member and the first support plate are integrally formed as one member.

17. The rack bar supporting device of claim 16, wherein the second support plate is disposed at an initial installation state in a state of being supported by the adjustment member to be spaced from the second support member.

18. A rack bar supporting device for supporting a rack bar of a steering apparatus of a vehicle toward a pinion shaft, comprising;
a rack bearing which is disposed at an opposite side of the pinion in a state of contacting the rack bar; and
a biasing assembly which provides a force of pushing the rack bearing along a biasing axis toward the rack bar so that the rack bearing pushes the rack bar to be engaged with the pinion shaft, wherein the biasing assembly comprises:
an adjustment plug which can be fixed at a plurality of positions along the biasing axis;
an adjustment assembly comprising an adjustment member which is formed to be able to move along the biasing axis relative to the adjustment plug toward the rack bearing and a first biasing member which is connected respectively to the adjustment plug and the adjustment member so as to provide a force of pushing the adjustment member toward the rack bearing with respect to the adjustment plug; and
a support plate assembly comprising:
a first support plate which is supported by the rack bearing,
a second support plate which is disposed to face the first support plate in a state of being supported by the adjustment member,
a second biasing member which is interposed between the first and the second support plates so as to provide a force of pushing the first support plate along the biasing axis with respect to the second support plate,
a first support member which supports the first support plate, and
a second support member which is connected to the first support member such that the first and the second support plates are disposed therebetween and is formed to restrict movement of the second support plate in a direction away from the rack bearing,
wherein the second support plate is disposed at an initial installation state in a state of being supported by the adjustment member to be spaced from the second support member so as not to be supported by the second support member in a direction of the biasing axis.

19. A rack bar supporting device for supporting a rack bar of a steering apparatus of a vehicle toward a pinion shaft, comprising;
a rack bearing which is disposed at an opposite side of the pinion in a state of contacting the rack bar; and
a biasing assembly which provides a force of pushing the rack bearing along a biasing axis toward the rack bar so that the rack bearing pushes the rack bar to be engaged with the pinion shaft,
wherein the biasing assembly comprises:
an adjustment plug which can be fixed at a plurality of positions along the biasing axis;
an adjustment assembly comprising an adjustment member which is formed to be able to move along the biasing axis relative to the adjustment plug toward the rack bearing and a first biasing member which is connected respectively to the adjustment plug and the adjustment member so as to provide a force of pushing the adjustment member toward the rack bearing with respect to the adjustment plug; and
a support plate assembly comprising:
a first support plate which is supported by the rack bearing,
a second support plate which is disposed to face the first support plate in a state of being supported by the adjustment member,
a second biasing member which is interposed between the first and the second support plates so as to provide a force of pushing the first support plate along the biasing axis with respect to the second support plate,
a first support member which supports the first support plate, and
a second support member which is connected to the first support member such that the first and the second support plates are disposed therebetween and is formed to restrict movement of the second support plate in a direction away from the rack bearing,
wherein the second support plate is disposed in a state of contacting none of the first support plate and the second support member such that gaps exist in a direction of the biasing axis respectively between the second support plate and the first support plate and between the second support plate and the second support member.

* * * * *